Patented July 14, 1925.

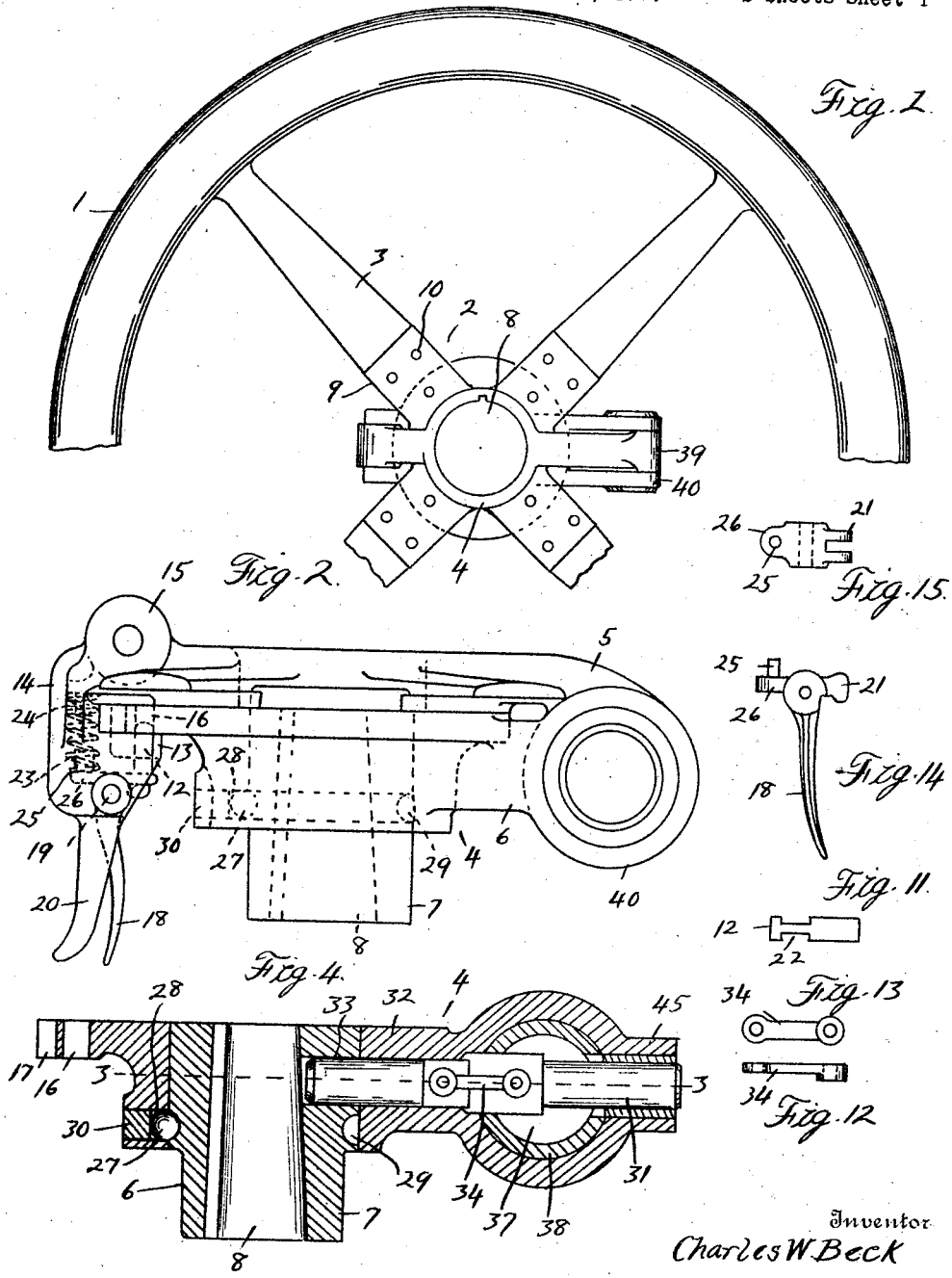

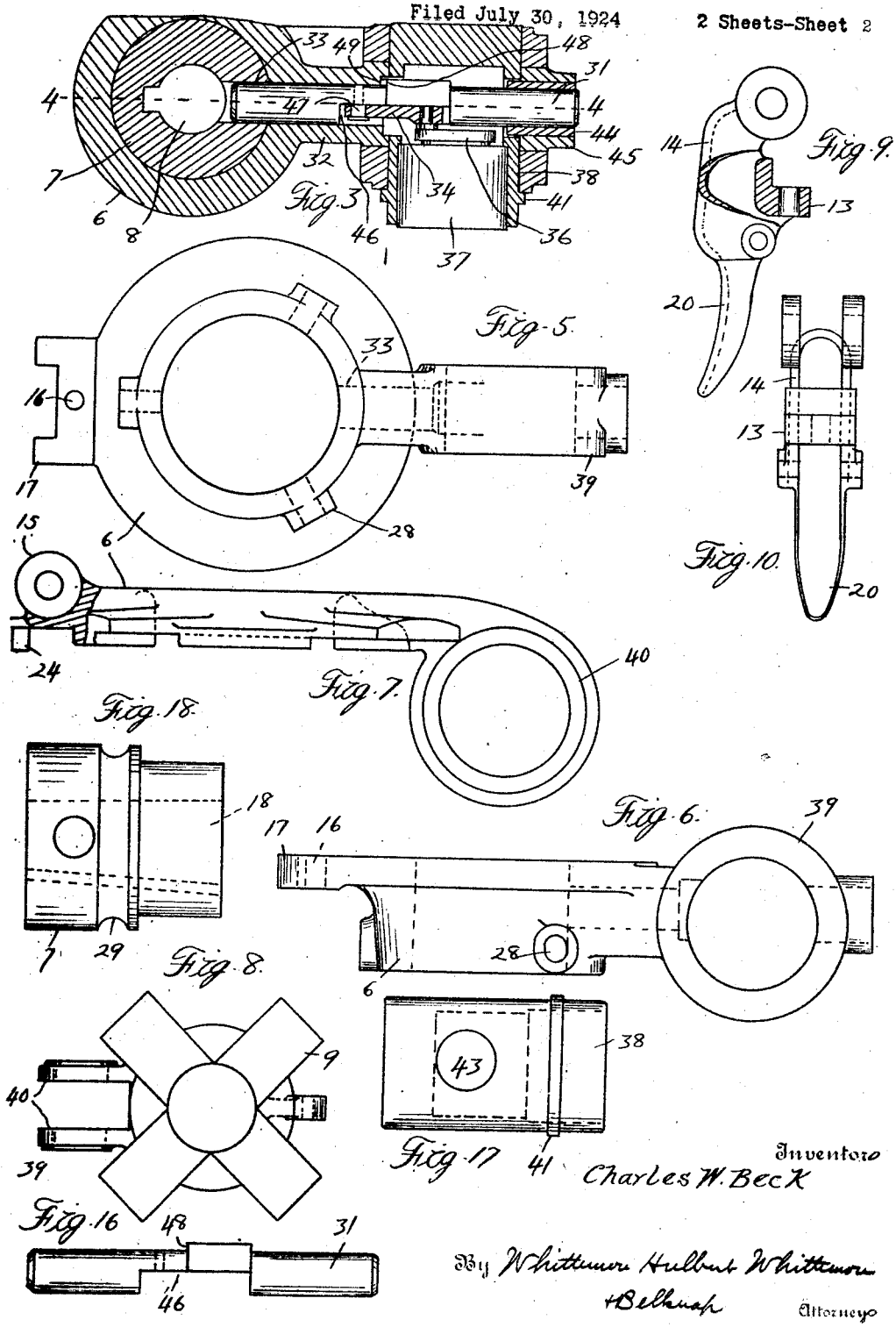

1,545,729

UNITED STATES PATENT OFFICE.

CHARLES W. BECK, OF DETROIT, MICHIGAN, ASSIGNOR TO THE BECK-FROST CORPORATION, OF DETROIT, MICHIGAN, A CORPORATION OF MICHIGAN.

COMBINED LOCKING AND TILTING STEERING WHEEL.

Application filed July 30, 1924. Serial No. 729,167.

*To all whom it may concern:*

Be it known that I, CHARLES W. BECK, a citizen of the United States of America, residing at Detroit, in the county of Wayne and State of Michigan, have invented certain new and useful Improvements in Combined Locking and Tilting Steering Wheels, of which the following is a specification, reference being had therein to the accompanying drawings.

This invention relates generally to steering wheels for motor vehicles, boats and the like and refers more particularly to steering wheels of the tilting type having spiders which are preferably connected to the hub-piece by means of a suitable lock.

One of the essential objects of the invention is to provide a wheel of this type having a simple form of lock which is preferably carried by the spider portion of the wheel and is provided with a locking bolt that is adapted to be moved by a suitable key into engagement with the hub-piece for operably connecting the spider portion thereto, or moved out of engagement with the hub piece for rendering the steering wheel inoperative.

Another object is to provide a simple form of latch for normally holding the hinged sections of the wheel head together in operative position.

While it is believed that from the foregoing description the nature and advantages of the invention will be readily apparent, I desire to have it understood that I do not limit myself to what is herein shown and described, and that such changes may be resorted to when desired as fall within the scope of what is claimed.

In the accompanying drawings;

Figure 1 is a top plan view of a steering wheel embodying my invention.

Figure 2 is a side elevation thereof.

Figure 3 is a sectional view taken on the line 3—3 of Figure 1.

Figure 4 is a sectional view taken on the line 4—4 of Figure 3.

Figure 5 is a top plan view of the lower section of the wheel head.

Figure 6 is a side elevation of the lower section of the wheel head.

Figure 7 is a side elevation of the upper section of the wheel head.

Figure 8 is a bottom plan view of the upper section of the wheel head.

Figure 9 is a fragmentary detail elevation of one of the levers.

Figure 10 is a rear elevation of the lever shown in Figure 9.

Figure 11 is a detail elevation of the latch pin.

Figure 12 and Figure 13 are detail views of the connecting link.

Figure 14 is a side elevation of the smaller lever.

Figure 15 is a top plan view of the lever shown in Figure 14.

Figure 16 is a side elevation of the locking bolt.

Figure 17 is a side elevation of the lock casing bushing.

Figure 18 is a side elevation of the hub piece.

Referring now to the drawings in which like characters of reference designate corresponding parts throughout the several views, the numeral 1 designates a rim, preferably of wood secured to a metallic spider 2 which includes a plurality of radially extending arms 3 and a head 4, the latter preferably comprising the hinge sections 5 and 6 respectively. As shown, the lower section 6 is preferably sleeved upon a suitable hub piece 7 which has a centrally tapered bore 8 for receiving the usual steering stem (not shown) of a motor vehicle, while the upper section 5 is preferably provided with radially extending slots 9 which receive the spider arms 3 so that the lower face of the arms will be flush with the lower face of the upper section. Any suitable means such as the countersunk screw bolts 10 may be used to secure the spider arms 3 to the bases of the slots 9 in the upper section 5, while relatively short reinforcing projections 11 extend radially from the upper section 5 and rest upon the spider arms 3 as shown in Figure 1 of the drawings.

For normally holding the hinge sections 5 and 6 of the head together, I preferably provide a suitable latch pin 12 that is preferably slidably mounted in a short lug 13 projecting laterally from a lever 14 pivoted upon a radial projection 15 of the upper section 5 and is adapted to be projected upwardly into a vertical opening 16 in a radial projection 17 of the lower section 6. For actuating the latch pin 12, I preferably provide a lever 18 that is pivoted upon a pin 19 extending through the lever 14 at the upper end of the handle portion 20 thereof and is provided with spaced laterally extending lugs 21 that embrace the reduced portion 22 of the pin 12. This pin is normally held in projected position by means of a suitable coil spring 23 that surrounds a lug 24 upon the radial projection 15 of the upper section 5, and a similar lug 25 upon a lateral extension 26 of the lever 18. Thus, with this construction, the spring 23 will hold the lever 14 downwardly and will automatically project the pin 12 into the opening 16 in the radial projection 17 of the lower section 6 when the lug 13 upon the lever 14 is moved beneath the radial projection 17. The upper section 5 may be released from the lower section 6 by merely moving the handle portion of the lever 18 against the tension of the spring 23 toward the handle portion 20 of the lever 14 to withdraw the pin 12 from the opening 16 and subsequently swinging the lever 14 outwardly so that the lug 13 may be removed from beneath the radial projection 17.

In order that the spider 2 may rotate freely about the hub piece 6, I preferably provide three anti-friction bolts 27 that are located at the inner ends of spaced radial passages 28 in the lower section 6 of the head and engage a peripheral groove 29 in the hub piece 7. These bolts are held in position by means of suitable plugs 30 that close the passages 28 in the lower section 6 of the head.

For locking the wheel spider 2 to the hub piece 6, I preferably provide a locking bolt 31 that is preferably slidably mounted in the neck portion 32 of the lower section 6 and is adapted to be projected into a radial recess 33 in the hub piece 6 by means of a link 34 connected to an eccentric pin 35 that projects inwardly from the inner end of a rotatable cylinder 36 of a suitable tumbler lock 37. As shown, the lock casing is preferably located within a suitable bushing 38 which extends through the cooperating hinge parts 39 and 40 respectively of the lower and upper sections 6 and 5. The bushing 38 is preferably closed at one end and is provided adjacent to its opposite open end with an annular flange 41 that bears against the adjacent face of the bifurcated hinge part 40 of the upper section 5, while the locking bolt 31 preferably extends through an aligned opening 43 in the bushing 38 and is slidably mounted in a short bushing 44 secured within a tubular radial projection 45 of the intermediate hinge part 39 of the lower section 6. To economize space, the bolt 31 is preferably cut away as shown at 46 to receive the link 34 which is preferably pivoted at its outer end to the bolt by means of a suitable pin 47. For limiting the outward movement of the locking bolt 41 so that the pin 37 and the eccentric 35 will be relieved of any undue strain, the bolt 31 is preferably provided intermediate its ends with a suitable shoulder 48 that is adapted to abut a correspondingly shaped shoulder 49 in the neck portion 32 of the lower section 6.

In use, the proper key may be used to operate the lock mechanisms so that the cylinder 36 may be turned by the key to actuate the locking bolt 31. When the bolt is projected, the hub piece 6 will be operably connected to the spider 2 and will turn therewith in the usual way to steer the vehicle. However when the bolt 31 is retracted, the spider 2 will be disconnected so that it will rotate freely upon the hub piece 6 and the steering wheel will be rendered inoperative for steering the vehicle. Whenever the driver desires to enter or leave the vehicle, the pin 12 may be withdrawn from the opening 16 in the projection 17 of the lower section 6 of the wheel head, whereupon the spider may be tilted to give more room. If desired, the bolt 31 may be projected by the key of the lock 37 when the spider 2 is tilted to prevent the spider from being returned to lower position on the hub piece.

While it is believed that from the foregoing description the nature and advantages of the invention will be readily apparent, I desire to have it understood that I do not limit myself to what is herein shown and described, and that such changes may be resorted to when desired as fall within the scope of what is claimed.

What I claim as my invention is:

1. In a steering wheel, the combination with a hub piece, of a sectional head mounted on the hub piece, one section of said head being hingedly connected to the other, and means for normally holding said sections together including a lever carried by the upper section having a lug engageable with a projection of the lower section, and means carried by the lug adapted to move transversely of the lower section.

2. In a steering wheel, the combination with a hub piece, of a sectional head mounted on the hub piece, one section of said head being hingedly connected to the other, and means for normally holding said sections together, including a lever carried by the upper section having a lug engageable with the projection of a lower section, a latch pin carried by the lug adapted to move transversely of the lower section, and means carried by the lever for actuating the latch pin.

3. In a steering wheel, the combination with a hub piece, of a sectional head mounted on the hub piece, one section of said head being hingedly connected to the other, and means for normally holding said sections together including a lever pivoted to the upper section and having a lug engageable with a projection of the lower section, a latch pin movable transversely of said lug and the projection of the lower section, yieldable means normally holding said lever in lowered position and retaining said latch pin in engagement with said lug and projection aforesaid, and means for retracting said lug against the tension of said yieldable means.

4. In a steering wheel, the combination with a hub piece, of a sectional head mounted on the hub piece, one section of said head being hingedly connected to the other, and means for normally holding said sections together including a lever pivotally mounted upon the upper section and having a lug engageable with a lower face of a projection of the lower section, a latch pin movable transversely of the lug and projection, and a lever pivoted upon the lever aforesaid and having means for actuating the latch pin.

5. In a steering wheel, the combination with a hub piece, a sectional head mounted on the hub piece, one section of said head being hingedly connected to the other, and means for normally holding said sections together including a lever pivotally connected to the upper section and having a lug engageable with a projection of the lower section, a lever pivotally connected to the lever aforesaid, a latch pin carried by the last mentioned lever and movable transversely of the lug and projection aforesaid, and a yieldable member engageable with a portion of the upper section of said head and a portion of said lever for normally retaining said latch pin in engagement with said lug and projection.

6. In a steering wheel, the combination with a hub piece, and a sectional head mounted on the hub piece, one section of said head being hingedly connected to the other, means for normally holding the sections together including a lever pivoted to the upper section, and a pin carried by the lever engageable with the lower section, and means for holding the lever downwardly in operative position with respect to the lower section and also automatically moving the pin into locking engagement with the lower section.

7. In a steering wheel, the combination with a hub piece, and a spider head having pivotally connected sections mounted on the hub piece, of means for holding said sections together including a lever carried by one section having a shoulder engageable with the second section, and a member carried by the lever engageable with the second section, and means normally holding the shoulder of the lever and said member in operative position with respect to the second section.

8. In a steering wheel, the combination with a hub piece, and a spider head having pivotally connected sections mounted on the hub piece, of means for holding said sections together including a lever carried by one section having a shoulder engageable with the second section, a pin carried by the lever engageable with a recess in the second section, a lever for retracting said pin, and means carried by the second lever normally holding the shoulder of the first lever and said pin in operative position with respect to the second section.

9. In a steering wheel, the combination with a hub piece, and a spider head having pivotally connected sections mounted on the hub piece, of means for holding said sections together including a lever carried by one section having a shoulder engageable with the second section, a pin carried by the said lever engageable with a recess in the second section, a lever carried by the lever aforesaid for retracting said pin, and a yieldable member carried by the second lever normally holding the shoulder of the first lever and said pin in operative position with respect to the second section.

In testimony whereof I affix my signature.

CHARLES W. BECK.

Witnesses:
G. RADY,
M. FLAHERTY.